Figure 1:
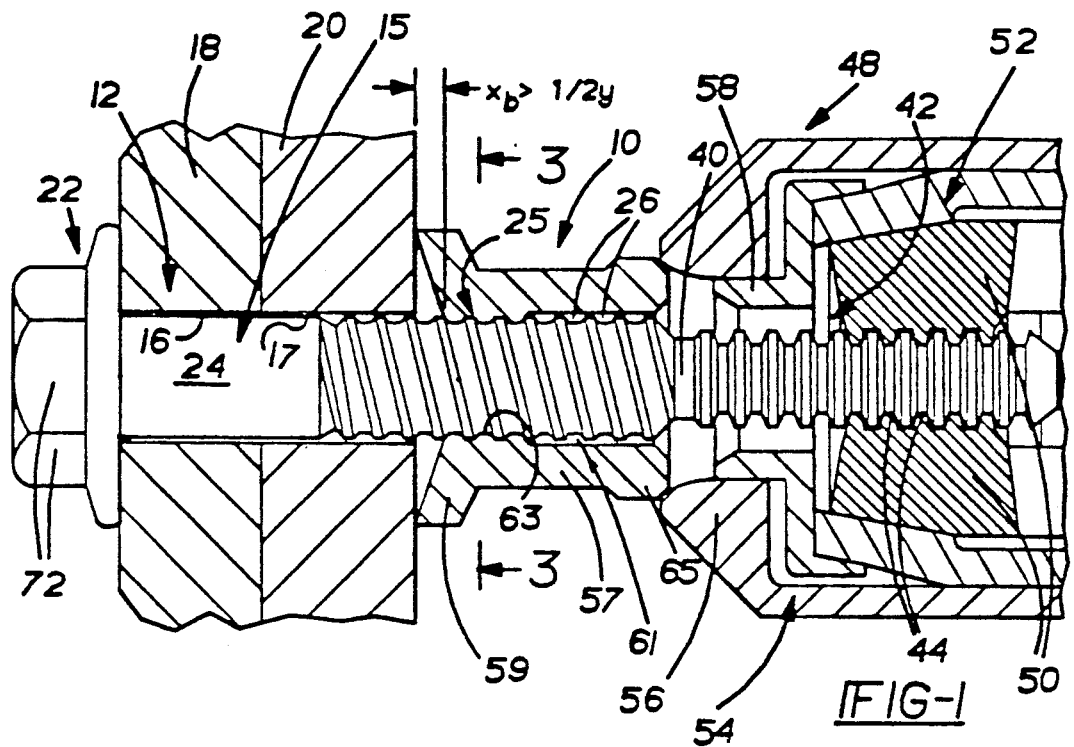

United States Patent [19]

Sadri

[11] Patent Number: 5,125,778
[45] Date of Patent: Jun. 30, 1992

[54] FIT UP SWAGE FASTENER WITH A VARIABLE AND SELECTIVELY HIGH INITIAL CLAMP PRE-LOAD AND METHOD

[75] Inventor: Shahriar M. Sadri, El Torro, Calif.

[73] Assignee: Huck Manufacturing Company, Irvine, Calif.

[21] Appl. No.: 328,305

[22] Filed: Mar. 24, 1989

[51] Int. Cl.⁵ .............................................. F16B 19/00
[52] U.S. Cl. .................................................. 411/361
[58] Field of Search ............... 411/361, 360, 39, 260, 411/261, 501, 277, 276, 285, 2, 1, 436, 500, 337, 333, 336, 334, 335

[56] References Cited

U.S. PATENT DOCUMENTS

| | | | |
|---|---|---|---|
| 2,531,048 | 11/1950 | Huck | 411/361 |
| 2,531,049 | 11/1950 | Huck | 411/361 |
| 3,215,024 | 11/1965 | Brilmyer et al. | 411/361 |
| 3,421,562 | 1/1969 | Orloff et al. | 411/336 |
| 3,915,053 | 10/1975 | Ruhl | 411/361 |
| 4,112,811 | 9/1978 | King | 411/361 |
| 4,136,596 | 1/1979 | Davis, Jr. | 411/360 |
| 4,472,096 | 9/1984 | Ruhl et al. | 411/361 |
| 4,867,625 | 9/1989 | Dixon | 411/361 |
| 4,921,384 | 5/1990 | Nordyke | 411/361 |

FOREIGN PATENT DOCUMENTS

| | | | |
|---|---|---|---|
| 2096724 | 10/1982 | United Kingdom | 411/2 |
| 8606447 | 11/1986 | World Int. Prop. O. | 411/34 |
| 8606448 | 11/1986 | World Int. Prop. O. | 411/361 |

*Primary Examiner*—Rodney M. Lindsey
*Attorney, Agent, or Firm*—Harness, Dickey & Pierce

[57] ABSTRACT

A fastening system including a swage type fastener including a pin and a collar adapted to be swaged into helical lock grooves in the pin and with the collar having a female thread which is threadably engageable with the helical lock grooves to selectively clamp or locate the workpieces relative to each other more or less prior to swage, with the collar thread being of a strength to deform or shear relative to the pin threads in response to a relative axial load between the pin and collar at the initiation of the swage operation but prior to swaging and in which the fastener includes a resistance member for permitting pre-clamping of the workpieces together at a selected pre-assembly pre-load while subsequently permitting sufficient relative axial movement between the pin and collar after pre-clamping such that the collar threads can be deformed or sheared prior to initiation of swage whereby the final clamp-up load of the workpieces is substantially uninhibited by the initial threaded engagement of the pin and collar threads.

25 Claims, 2 Drawing Sheets

FIT UP SWAGE FASTENER WITH A VARIABLE AND SELECTIVELY HIGH INITIAL CLAMP PRE-LOAD AND METHOD

SUMMARY BACKGROUND OF THE INVENTION

The present invention relates to multi-piece fasteners and more particularly to a swage type fastener having a variable clamp capability for initial fit up of workpieces and to a method for securing workpieces with an initial fit up and final clamp.

The present invention generally relates to two-piece swage type fasteners or lockbolts of the type illustrated in U.S. Pat. No. 3,915,053 to J. Ruhl, issued Oct. 28, 1975, U.S. Pat. No. 2,531,048 to L. Huck, issued Nov. 21, 1950 and to U.S. Pat. No. 4,472,096 to J. Ruhl and R. Dixon, issued on Sep. 18, 1984. The present invention is also an improvement upon U.S. Pat. No. 4,867,625 by Richard D. Dixon for Variable Clamp Fastener and Method issued Sept. 19, 1989. In addition the present invention could utilize the groove shape and concepts of U.S. patent application Ser. No. 185,327 by Richard D. Dixon for High Strength Fastener and Method filed on Apr. 20, 1988. All of the above patents and noted patent applications can be considered as prior art relative to the present invention.

The fastener of the present invention, as with the prior art noted, includes a pin and a collar adapted to be swaged into lock grooves in the pin in response to a preselected relative axial force applied between the pin and collar.

In many commercial applications, two-piece threaded fasteners are used and are installed in two or more steps. Thus it is common to secure a structure first by attaching the associated members with the fasteners loosely engaged or torqued to be partially tightened. This facilitates adjustment and/or alignment of the structural members to a final, desired orientation even by partial loosening of the fasteners if necessary. After such adjustment and/or alignment, the fasteners are tightened to a preselected final torque. A traditional problem with torque applied threaded fasteners is that the clamp force attained is generally unpredictable due to frictional and other factors, i.e. friction between nut and engaged workpiece surfaces, friction in the engaging threads, etc. Two-piece swage type fasteners, however, are not confronted with such frictional problems and hence can provide more uniformly predictable clamp loads. Except for the construction shown in the '625 Dixon patent, however, the swage type fasteners have not been capable of providing the initial variable clamp up available with threaded fasteners and still provide a full clamp with only a second, final installation step. Prior threaded swage and/or crimp type fasteners would require extra steps or complex tooling. For example, a threaded crimp type fastener would not provide the same flexibility without complex installation tools; see for example the U.S. Pat. No. 3,421,562 to J. F. Orloff et al issued Jan. 14, 1969. While the latter fastener would permit an initial variable clamp load similar to a conventional threaded fastener, the final installation would require either two additional steps of final torquing and crimping or a complex tool capable of performing the latter steps in sequence.

In the prior art construction of the '625 Dixon patent, as in the present construction, the lock grooves of the pin are in the form of a helical male thread. The collar is provided with a mating, female thread of a preselected extent such that the initial clamp can be accommodated. The female collar thread is selected to be of a limited extent and shear strength such that the collar can be brought to its final, desired clamp position and swaged to the pin via a conventional installation tool. Thus for the final installation, a conventional pull tool can be used to apply a relative axial force between the pin and the collar. The extent of the female collar thread is selected such that, in response to the relative axial force and at a level prior to the initiation of collar deformation or swaging into the lock grooves of the pin, it will shear or deform such that the collar will be free to move axially over the pin and to respond to the installation loads in the same manner as a collar without such limited female thread form. Now the workpieces can be finally clamped together with the same effectiveness as typical swage type fasteners.

In numerous situations, the structure being built is first pre-assembled in one position or location and is then erected or moved to its ultimate position or location where the final assembly takes place. In such conditions, the fastener can be subjected to separation or handling loads of significant magnitudes. In addition, it was found in other applications that a high initial clamp load via torquing would be desirable. In such situations a significantly limited thread may not have sufficient strength to withstand such loads. Thus in such instances, these objectives could be accomplished by the use of a thread that was limited but yet comprising more or higher strength collar threads for engagement with corresponding pin threads. With a limited thread having more threads or a thread form having a higher shear strength, however, the attainment of the desired final clamp load in swage could be inhibited by the resistance of the engaged thread or threads to axial movement of the collar. Furthermore, in some applications, the workpieces could be tightly clamped in the pre-assembly step. In such cases, with the prior of the '625 Dixon patent construction, since further axial movement of the collar would be substantially precluded, shearing of the more extensive or higher strength limited thread form during swage would be inhibited whereby non-uniform final clamp loads could result between different fasteners in the same or separate structures. To overcome these problems and to permit the use of more or higher strength threads, the collar of the present invention is provided with a dished flange at its workpiece engaging end. The flange acts as a spring or resistance member such that it will resist the torque load for an initial high pre-load but can deflect or collapse upon application of the axial loads in swaging the collar for the final clamp up. Importantly, however, the dished flange will permit axial movement of the collar or of the threaded portion of the collar of at least around one half of the thread pitch such that it will not be fully collapsed until the engaged collar thread or threads have been sheared and/or deformed sufficiently to permit substantially uninhibited transfer of the relative axial force between the pin and collar to provide the desired final clamp load to the workpieces. Now sufficient threads can be employed to resist separation or handling loads in the pre-assembly and/or to permit a pre-assembly clamp load of a relatively high magnitude.

In some applications it is desirable that the fasteners have a high strength, high performance characteristic both in clamp up and in fatigue. In this latter regard then, it may be advantageous to utilize the groove shape and concepts of the invention of the '327 application and the '625 Dixon patent.

Thus, in one form of the present invention, the lock grooves in the pin are very shallow and are constructed to have roots of a simulated streamlined shape. The lock grooves are helical and define a desired thread configuration. The shallow grooves and simulated streamlined shape, however, provide a resultant fatigue life which is superior to that of a comparable threaded fastener. Since the preceding construction is shown and described in the noted patents and applications and since the present invention is not restricted to such a construction, the details thereof, while incorporated by reference, have been omitted for purposes of simplicity.

Thus it is an object of the present invention to provide a novel multi-piece swage type fastener for a fastened joint with a pin having a lock groove section with a helical thread form and with a collar adapted to be swaged into the lock groove section and having a preselected complementary threaded portion allowing a threaded connection whereby a selectively variable clamp load can be initially applied to the fastened joint prior to swage.

It is another object of the present invention to provide a novel multi-piece swage type fastener of the type noted in the preceding object in which the collar thread is adapted to be sheared or deformed at a preselected relative axial load applied by a swaging tool with that axial load being of a magnitude less than that required to initiate swaging of the collar to the pin.

It is still another object to provide a novel multi-piece, swage type fastener of the above described type in which the collar has a cooperating flange portion which is dished and deformable at a preselected axial load applied during the swage operation to permit shearing or deformation of the collar threads through relative axial movement of the pin and collar whereby attainment of the desired final clamp load upon completion of swaging is substantially uninhibited.

It is an object of the present invention to provide a multi-piece swage type fastener of the above described type having resistance means associated with the fastener which is deformable at a preselected axial load applied during the swage operation to permit shearing or deformation of the collar threads through relative axial movement of the pin and collar whereby attainment of the desired final clamp load upon completion of swaging is substantially uninhibited.

It is another general object of the present invention to provide a novel multi-piece swage type fastener.

It is still another general object of the present invention to provide a novel fastening system and method for securing workpieces utilizing a fastener and the preassembly of the above described type before final clamp up.

Figure 3:
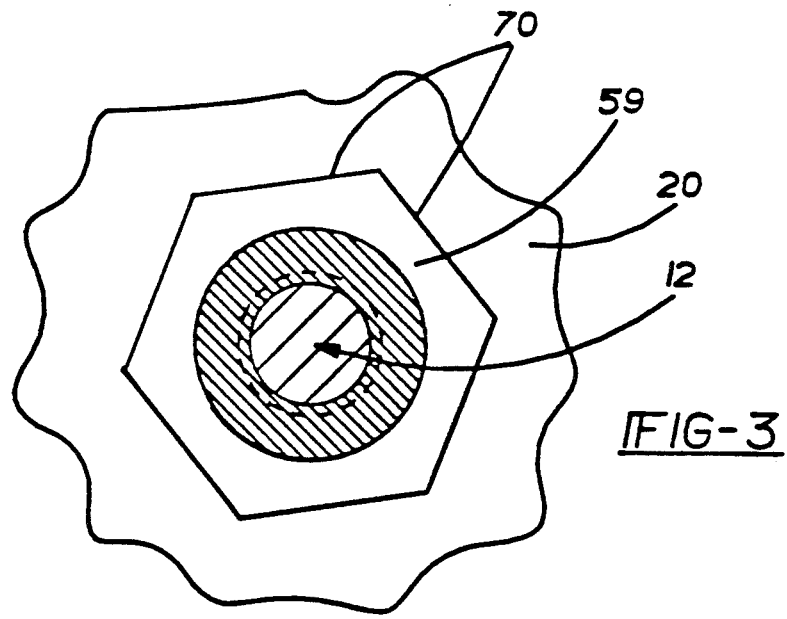
Figure 2:
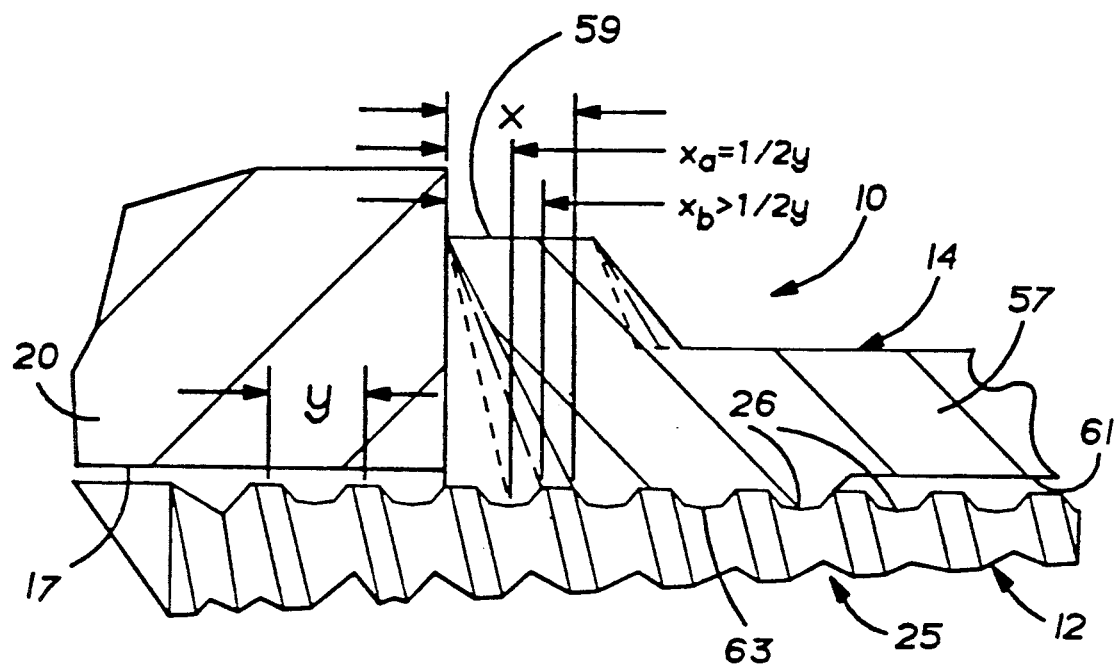
Figure 4:
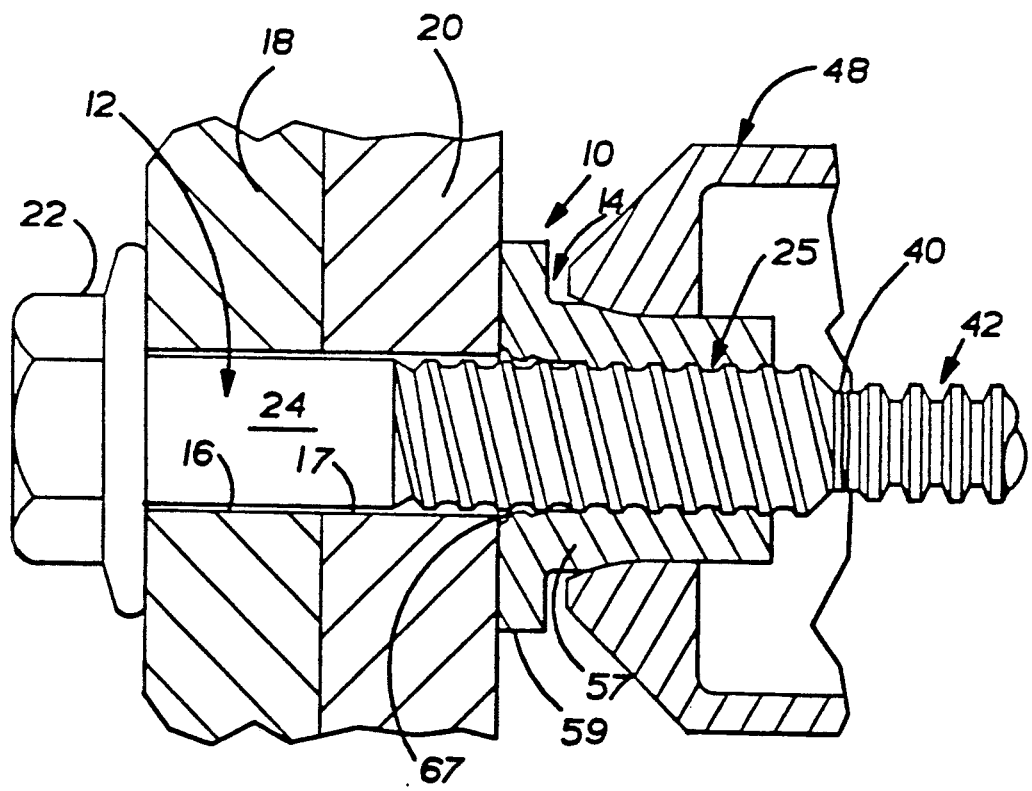

Other objects, features and advantages of the present invention will become apparent from the subsequent description and the appended claims, taken in conjunction with the accompanying drawings, in which:

FIG. 1 is a longitudinal view with some portions shown in section and others shown broken away of a fastener of the present invention including a pin and a collar, in assembly relationship with workpieces with the collar having a dished flange and with the collar being threaded upon a threaded portion of the pin with the workpieces being pre-assembled via torque applied to the fastener to provide an initial clamp load and with a portion of a pull tool shown as applied to the fastener prior to swage of the collar into the threaded portion of the pin to provide the final, desired clamp load;

FIG. 2 is a fragmentary view of the assembly of FIG. 1 to enlarged scale depicting the fastener before it has been torqued to a desired pre-load and with the deformable flange on the collar shown relaxed or in a non-collapsed condition and depicting in phantom various degrees of collapse in response to different magnitudes of torque applied between the collar and pin;

FIG. 3 is an enlarged sectional view of the fastener of FIG. 1 taken in the direction of the Arrows 3—3 depicting the fastener with the collar having flats to be gripped by a conventional torquing tool or wrench, not shown; and FIG. 4 is an enlarged view similar to that of FIG. 1 showing the assembly with the fastener after it has been set with the flange collapsed and collar swaged onto the pin to provide the final desired clamp load.

Looking now to FIGS. 1 and 2, a fastener 10 is shown to include a pin member 12 and tubular collar 14. Pin member 12 has an elongated shank 15 which extends through aligned openings 16 and 17 in a pair of workpieces 18 and 20, respectively, to be secured together. An enlarged protruding head 22 at one end of shank 15 engages one side of workpiece 18. Adjacent the head 22, the shank 15 has a straight portion 24 which is adapted to be received within aligned bores 16 and 17 with a clearance fit. Following the straight portion 24 is a lock groove portion 25 defined by a plurality of grooves 26 having a continuous, helical thread form.

A breakneck groove 40 is located between the lock groove portion 25 and a gripping or pull portion 42 and defines the weakest portion on the shank 15. The pull portion 42 is comprised of a plurality of annular pull grooves 44 which are of a reduced diameter relative to the shank portion 24 and the lock groove portion 25. The pull grooves 44 are adapted to be gripped by a tool 48 which is actuable to set the fastener 10. The tool 48 can be generally constructed in a manner known to those skilled in the art and hence is only partially shown for purposes of simplicity. Briefly, the tool 48 has a plurality of jaws 50 adapted to grip the pin 12 at pull grooves 44. Jaws 50 are located in a tubular collet assembly 52 which is slidably supported in an anvil housing 54 which terminates at one end in a swage anvil portion 56.

The tubular collar 14 has a generally straight shank 57 terminating in an enlarged flange 59. Both the pin head 22 and collar flange 59 are provided with wrenching flats or irregularities to facilitate gripping by a wrench or other suitable tool for applying a relative torque between the pin member 12 and collar 14. With regard to the latter, the collar 14 has a generally uniform, smooth bore 61 of a diameter to be in clearance with the portion of the pin shank 15 extending past workpiece 20; a relatively limited female thread 63 is formed at the flange end of the bore 61 and is adapted to complementarily, threadably engage the helical lock grooves or pin threads 26. The shape of the collar threads 63 is substantially the same as the shape of the pin threads 26 for providing good mating engagement. An enlarged bead 65 is formed at the end of the collar 14 opposite flange 59 to provide increased hold-off or stand-off to initiation of swage for a purpose to be seen. Looking now to FIG. 2, the flange 59 is dished concavely inwardly a preselected axial distance X from the radially and axially outer end to the radially and axially inner end. The relaxed distance X is selected to be no less than around one half the distance Y which is the pitch of the pin and collar threads 26 and 63. The relaxed distance X is preferably greater than ½ Y for purposes to be seen.

In operation, the workpieces 18 and 20 can be first joined together by the threaded engagement between the collar thread 63 and the threaded lock grooves 26. The pull portion 42 has a maximum diameter less than the inside diameter of the collar thread 63 so that the collar 14 can be moved onto the pin 12 and collar thread 63 readily applied to the lock groove portion 25. The number of threads 63 of the collar 14, while generally limited, is selected to be of sufficient strength to permit the collar 14 to be torqued to provide a desired high pre-assembly initial clamp force between workpieces 18 and 20 and/or to resist anticipated separating or handling forces between the workpieces 18 and 20 which are relatively high in magnitude. Here the invention permits an initial clamp force via torquing varying from a nominal clamp load to a clamp load having a magnitude at which the enlarged flange 59 will deflect to reduce the distance X to the distance Xa (see FIG. 2). In this manner the workpieces 18 and 20 can be selectively clamped or located more or less relative to each other. In any event, the initial deflection of the flange 59 will be limited such that the distance Xa will be at least equal to around one half of the pitch distance Y. Thus additional deflection of the flange 59 of at least around ½ Y, will still remain available for the swage operation to follow. This in turn will permit the shank 57 to axially move the distance Xa during the swage step but prior to initiation of swage, or initial deformation of the collar 14 into the lock groove portion 25; thus as the relative axial force in the swage operation is applied between the pin 12 and collar 14 the collar shank 57 in moving the distance Xa will axially override the engaged threads whereby the desired final clamp load can be attained.

The magnitude of applied torque and hence of the initial deflection of the flange 59 can be controlled by a suitable torque controlled wrench. Thus the wrenching surfaces on the pin head 22 and collar flange 59 facilitate the collar 14 to be torqued to a preselected magnitude to provide the desired pre-assembly or initial clamp force between workpieces 18 and 20. Thus looking now to FIG. 3, the flange 59 is provided with an outer surface having a contour comprising a series of flats 70. A conventional wrench (not shown) having a similarly contoured wrenching surface can engage the the flats 70. In a like manner the enlarged pin head 22, can be provided with flats 72 or other surface irregularities to facilitate gripping with a wrench (not shown) whereby the desired torque can be applied. The maximum magnitude of torque applied to the fastener 10 will be limited such that the initial deflection of the flange 59 will still leave a pre-fastened or pre-clamped distance Xa which is no less than around one half the thread pitch Y while at the same time maintaining the integrity of the collar threads 63.

With this structure, after the torquing operation, the fastener 10 can now be finally set by the application of a relative axial force. Thus after the pre-assembly has been accomplished the installation tool 48 is applied to the fastener 10, as shown in FIG. 1, and a relative axial force is applied between the pin 12 and collar 14 via the jaw assembly 50 gripping the pull groove portion 42 and the swage anvil 56 engaging the outer end of the collar 14. As the relative axial force increases, the collar threads 63 will shear or deform sufficiently to permit the collar shank 57 to move further axially relative to the pin 12 and to collapse the flange 59. Thus where the workpieces 18 and 20 have been pre-clamped together, via torquing of the fastener 10, and where no gap exists therebetween, the collar flange 59 will collapse as the noted axial movement of the collar shank 57 occurs permitting the desired shearing and/or deformation of the collar threads 63. In this condition, however, the swaging or deformation of the material of the collar 14 into the pin lockgrooves 26 has not yet started and, hence, the pin 12 and collar 14 can now respond as a typical swage type fastener; thus now the workpieces 18 and 20 are pulled together at a preselected load by the relative axial force applied by the installation tool 48 between the pin 12 and collar 14, the same as if the collar 14 had not been threadably engaged with the pin 12, and, as the axial force increases, swaging of the collar 14 into the helical lock groove portion 25 begins. Upon the completion of swaging and as the axial force continues to increase, a magnitude will be attained at which the pin 12 will fracture at the breakneck groove 40 completing the swaging operation (see FIG. 4). Subsequently, upon further actuation of the tool 48, a collar ejector member 58 will be urged forwardly to eject the swaged collar 14 from the anvil 56 thus completing the installation. Thus the workpieces 18 and 20 will be secured together under a final clamp load substantially the same as if the initial pre-assembly via the threaded fit-up connection had not occurred.

Note that the contour of the swage cavity of the anvil portion 56 and the contour of the bead 65 at the outer end of the collar 14 are such as to provide a preselected hold-off or stand-off whereby initiation of swaging of the collar 14 into the lock grooves 26 will not begin until that magnitude of relative axial force has been attained which is sufficient to overcome any pre-load from pre-assembly torque, to shear or sufficiently deform the collar thread 63 and to collapse the flange 59. In this regard a collar of the construction shown in the copending U.S. Pat. No. 4,921,384, to issue May 1, 1990 by Keith D. Nordyke for Swage Fasteners With a High Stand-Off Collar could be advantageously utilized.

Thus the minimum stand-off load capability of the collar 14 must be generally equal to the combination or sum of the loads required to overcome any axial pre-load on the fastener 10, the axial load required to shear or deform the collar threads 63, and the load required to collapse the collar flange 59.

FIG. 2 depicts variations in deflection of the collar flange 59 in response to different magnitudes of pre-fastened clamp torque. Thus in one application the collar flange 59 can be deflected a predetermined axial distance in response to the maximum allowable torque which will still leave the axial deflection distance Xa available (generally equal to one half the thread pitch Y) to shear or sufficiently deform the collar threads 63 whereby, the desired high final clamp loads from swage can be attained. With a lesser magnitude of torque, the collar flange 59 will be deformed a lesser distance leaving an available axial deflection distance of Xb which is greater than Xa or one half the thread pitch Y. Thus, in that circumstance, the axial distance Xb will be available to accommodate the axial movement necessary to permit shearing or sufficient deformation of the collar threads 63 whereby the desired high clamp load from final swage can be achieved.

As the flange 59 collapses, the threaded bore at the workpiece engaging end of the flange 59 will expand radially as shown at 67 in FIG. 4; this will result in at least partial disengagement of the end ones of the collar threads 63 from the pin threads 26. In this way, the collapsing action of the flange 59 can assist in reducing the relative axial load necessary to overcome the resistance to the overriding axial movement between the engaged threads 26 and 63 on the pin 12 and collar 14, respectively.

As noted in the Dixon applications and in one embodiment of the present invention, the pin 12 can be provided with shallow helical grooves with a generally streamlined shape whereby a high strength construction can be achieved having a desirable high clamp load. With the noted shallow groove construction the volume of shank 57 of collar 14 was selected to generally provide 'overpacking', i.e., a volume of material to provide substantially more volume of collar material for filling pin grooves 26 than is available within the swage envelope defined by the swage cavity of anvil 56 and the confronting portion of lock grooves 26 of pin 12. In that construction, it has been found desirable to provide a volume of collar material which has an excess of around 14% to around 16%. Overpacking will result in a high prevailing torque resisting anti-rotation. Typically the fastener 10 could be constructed of materials generally having the strength characteristics of a Grade 5 threaded fastener.

To enhance the strength of the fastener 10, the with of the pin grooves 26 and associated pin shoulders and the complementary grooves and shoulders of the swaged collar 14 can be proportioned in width relative to the respective shear strengths of the materials of pin 12 and collar 14 such that both the shoulders defined by pin grooves 26 of the pin 12 and the shoulders defined by interlocking grooves of the swaged collar 14 are in incipient or simultaneous failure in shear at or above the preselected minimum ultimate design tensile load on workpieces 18 and 20. It is preferred that the design provide for the shoulders defined by the grooves of collar 14 to fail prior to the shoulders defined by pin lock grooves 26. i.e. the shoulders of pin 12 would fail in shear at approximately 110% of the tensile load at which the shoulders of collar 14 would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 25.

Another advantage of employing proportioned strength as noted is that the shear strength of the collar threads 63 can be maximized permitting the pre-fastened clamp via torquing to be at a relatively high magnitude and/or permitting the fastener 10 in its pre-fastened clamp condition to withstand the necessary loads to hold the structure together during the fit up operation. This is achieved by virtue of the fact that the width of collar threads 63 is substantially the same as the width of the groove of pin threads 26.

With the fastener 10 installed, the swaged collar 14 will have a complementary female thread formed in its bore 61. This will now permit the fastener 10 to be removed by torquing the collar 14 off via suitable tools applied to the wrenching surfaces on the pin head 22 and the collar flange 59. In this regard, the collar 14 could, in some circumstances have additional torque applied.

The fastener 10 shown and discussed above is a pull type fastener adapted to be finally installed by a conventional pull type tool 48. The features of the invention, however, are also applicable to a stump type fastener adapted to be finally installed by a squeeze type tool and/or to a pull type fastener having a pin which does not have a severable pin tail and/or to a pull type blind fastener utilizing a swagable collar.

As noted a unique fastener has been provided including a pin and collar having a threaded connection permitting a variation in initial clamp load or pre-assembly and with the threaded connection providing sufficient strength to resist pre-assembly separation and handling loads on the workpieces being connected while still permitting a high final clamp load via a swaged connection between the pin and collar. While the resistance means shown is in the form of a deformable flange on the collar it should be understood that other forms of construction operative between the pin and collar could be used as the resistance means.

Thus while it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system including a fastener for securing workpieces together with a selectively variable clamp with said fastener adapted to be finally installed via a relative axial force applied by an installation tool, said fastener comprising:

a pin having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a female thread formed on said through bore and adapted to threadably engage said thread form defined by said lock grooves, whereby said collar can be torqued onto said lock groove portion to selectively clamp or locate the workpieces relative to each other more or less, said collar thread having a preselected strength selected to deform or shear relative to said lock grooves in response to a second preselected magnitude of relative axial force applied between said pin and said collar by the installation tool with said second preselected magnitude being less than said first preselected magnitude, resistance means on said collar for permitting the workpieces to be initially clamped together under a preselected pre-load or located relative to each other more or less via torquing and thereafter being responsive to said relative axial force to permit relative axial movement between said collar and said pin of a sufficient axial distance such that said collar thread will deform or shear relative to said lock grooves with the movement of said axial distance and deforming or shearing of said collar thread occurring at a determinable magnitude of said relative axial force, said first preselected magnitude being greater than the combination of said determinable magnitude and said preselected preload whereby the final axial clamp up load of the workpieces is substantially uninhibited by the initial threaded engagement of said collar thread and said lock grooves.

2. The fastening system of claim 1 with said resistance means comprising a resistance member being deflectable in response to said determinable magnitude of said relative axial force to permit movement of said axial distance.

3. The fastening system of claim 1 with said resistance means comprising a resistance member engageable with one of said pin and said collar and engageable with one of the workpieces and being deformable in response to said determinable magnitude of said relative axial force to permit movement of said axial distance.

4. The fastening system of claim 1 with said axial distance being at least around one half the thread pitch of said collar thread.

5. The fastening system of claim 1 with said resistance means comprising a concave dished member associated with said collar and adapted to engage one of the workpieces and with said concave member being deformable in response to said determinable magnitude to permit said axial movement of said axial distance.

6. The fastening system of claim 5 with said axial distance being at least around one half the thread pitch of said collar thread.

7. The fastening system of claim 1 further comprising: wrenching means on said collar and said pin for facilitating torquing of said collar onto said lock groove portion to selectively clamp or locate the workpieces relative to each other more or less.

8. In a fastening system including a fastener for securing workpieces together with a selectively variable clamp with said fastener adapted to be finally installed via a relative axial force applied by an installation tool, said fastener comprising:

a pin having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a female thread formed on said through bore and adapted to threadably engage said thread form defined by said lock grooves, whereby said collar can be torqued onto said lock groove portion to selectively clamp or locate the workpieces relative to each other more or less, said collar thread having a preselected strength selected to deform or shear relative to said lock grooves in response to a second preselected magnitude of relative axial force applied between said pin and said collar by the installation tool with said second preselected magnitude being less than said first preselected magnitude, resistance means associated with said collar for permitting the workpieces to be initially clamped together under a preselected pre-load or located relative to each other more or less via torquing and thereafter being responsive to said relative axial force to permit axial movement of at least a portion of said collar including said collar thread relative to said pin of a sufficient axial distance such that said collar thread will deform or shear relative to said lock grooves with the movement of said axial distance and deforming or shearing of said collar thread occurring at a determinable magnitude of said relative axial force, said first preselected magnitude being greater than the combination of said determinable magnitude and said preselected preload whereby the final axial clamp up load of the workpieces is substantially uninhibited by the initial threaded engagement of said collar thread and said lock grooves.

9. The fastening system of claim 8 with said resistance means comprising a resistance member engageable with the confronting one of the workpieces and being deformable in response to said determinable magnitude of said relative axial force to permit movement of said axial distance.

10. The fastening system of claim 9 with said axial distance being at least around one half the thread pitch of said collar thread.

11. The fastening system of claim 8 with said resistance means comprising a concave dished member associated with said collar and adapted to engage the confronting one of the workpieces and with said concave member being deformable in response to said determinable magnitude to permit said axial movement of said axial distance.

12. The fastening system of claim 11 with said axial distance being at least around one half the thread pitch of said collar thread.

13. In a fastening system including a fastener for securing workpieces together with a selectively variable clamp with said fastener adapted to be finally installed via a relative axial force applied by an installation tool, said fastener comprising:

a pin having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a female thread formed on said through bore and adapted to threadably engage said thread form defined by said lock grooves, whereby said collar can be torqued onto said lock groove portion to selectively clamp or locate the workpieces relative to each other more or less, said collar thread having a preselected strength selected to deform or shear relative to said lock grooves in response to a second preselected magnitude of relative axial force applied between said pin and said collar by the installation tool with said second preselected magnitude being less than said first preselected magnitude, said collar having a concave dished portion adapted to engage the confronting one of the workpieces, said concave dished portion being axially deformable in response to a relative axial force with the axial deformation being at least a preselected axial distance, said concave dished portion permitting the workpieces to be initially clamped together under a preselected pre-load or located relative to each other more or less via torquing and thereafter being responsive to said relative axial force to permit relative axial movement between said collar and said pin of said axial distance with the movement of said axial distance and deforming or shearing of said collar thread occurring at a determinable magnitude of said relative axial force, said first preselected magnitude being greater than the combination of said determinable magnitude and said preselected pre-load whereby the final axial clamp up load of the workpieces is substantially uninhibited by the initial threaded engagement of said collar thread and said lock grooves.

14. The fastening system of claim 13 with said axial distance being at least around one half the thread pitch of said collar thread.

15. In a fastening system including a fastener for securing workpieces together with a selectively variable clamp with said fastener adapted to be finally installed via a relative axial force applied by an installation tool, and including pin the invention comprising:

a tubular collar adapted to be swaged onto the pin in response to a first preselected magnitude of said relative axial force applicable by the installation tool, said collar having a female thread adapted to threadably engage a thread form on the pin whereby said collar can be torqued onto the pin to selectively clamp or locate the workpieces relative to each other more or less, said collar thread having a preselected strength selected to deform or shear relative to the thread form on the pin in response to a second preselected magnitude of relative axial force applied between the pin and said collar by the installation tool with said second preselected magnitude being less than said first preselected magnitude, said collar having a concave dished portion adapted to engage the confronting one of the workpieces, said concave dished portion being axially deformable in response to a relative axial force with the axial deformation being at least a preselected axial distance, said concave dished portion permitting the workpieces to be initially clamped together under a preselected pre-load or located relative to each other more or less via torquing and thereafter being responsive to said relative axial force to permit relative axial movement between said collar and said pin of said axial distance with the movement of said axial distance and deforming or shearing of said collar thread occurring at a determinable magnitude of said relative axial force, said first preselected magnitude being greater than the combination of said determinable magnitude and said preselected pre-load whereby the final axial clamp up load of the workpieces is substantially uninhibited by the initial threaded engagement of said collar thread and said lock grooves.

16. The fastening system of claim 15 with said axial distance being at least around one half the thread pitch of said collar thread.

17. In a fastening system including a fastener for securing workpieces together with a selectively variable clamp with said fastener adapted to be finally installed via a relative axial force applied by an installation tool, said fastener comprising:

a pin having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a female thread formed on said through bore and adapted to threadably engage said thread form defined by said lock grooves, whereby said collar can be torqued onto said lock groove portion to selectively clamp or locate the workpieces relative to each other more or less, said collar thread having a preselected strength selected to deform or shear relative to said lock grooves in response to a second preselected magnitude of relative axial force applied between said pin and said collar by the installation tool with said second preselected magnitude being less than said first preselected magnitude, spring means on said collar for permitting the workpieces to be initially clamped together under a preselected pre-load or located relative to each other more or less via torquing and thereafter being responsive to said relative axial force to deflect to permit relative axial movement between said collar and said pin of a sufficient axial distance such that said collar thread will deform or shear relative to said lock grooves with the movement of said axial distance and deforming or shearing of said collar thread occurring at a determinable magnitude of said relative axial force, said first preselected magnitude being greater than the combination of said determinable magnitude and said preselected pre-load whereby the final axial clamp up load of the workpieces is substantially uninhibited by the initial threaded engagement of said collar thread and said lock grooves.

18. The fastening system of claim 17 with said spring means engageable with one of the workpieces and being deflectable in response to said determinable magnitude of said relative axial force to permit movement of said axial distance.

19. The fastening system of claim 17 with said axial distance being at least around one half the thread pitch of said collar thread.

20. The fastening system of claim 17 with said spring means comprising a concave dished member associated with said collar and adapted to engage one of the workpieces and with said concave member being deflectable in response to said determinable magnitude to permit said axial movement of said axial distance.

21. The fastening system of claim 20 with said axial distance being at least around one half the thread pitch of said collar thread.

22. The fastening system of claim 20 with said concave dished member collapsing in response to said relative axial force being greater than said combination of said determinable magnitude and said preselected pre-load and less than said first preselected magnitude of said relative axial force.

23. The fastening system of claim 17 with said spring means collapsing in response to said relative axial force being greater than said combination of said determinable magnitude and said preselected pre-load and less than said first preselected magnitude of said relative axial force.

24. The fastening system of claim 23 with said axial distance being at least around one half the thread pitch of said collar thread.

25. The fastening system of claim 17 further comprising:

wrenching means on said collar and said pin for facilitating torquing of said collar onto said lock groove portion to selectively clamp or locate the workpieces relative to each other more or less.

* * * * *